(12) United States Patent
Yang et al.

(10) Patent No.: US 8,625,217 B1
(45) Date of Patent: Jan. 7, 2014

(54) BRANCH METRIC COMPUTATION AND NOISE PREDICTIVE CALIBRATION/ADAPTATION FOR OVER-SAMPLED Y SAMPLES

(71) Applicant: LSI Corporation, Milpitas, CA (US)

(72) Inventors: Shaohua Yang, San Jose, CA (US); Xuebin Wu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/628,579

(22) Filed: Sep. 27, 2012

(51) Int. Cl.
*G11B 20/10* (2006.01)
*H04B 1/10* (2006.01)

(52) U.S. Cl.
USPC .......................................... 360/39; 375/350

(58) Field of Classification Search
None
See application file for complete search history.

(56) References Cited

U.S. PATENT DOCUMENTS

| 5,809,081 A * | 9/1998 | Karabed et al. ............... 375/263 |
| 2002/0154430 A1 * | 10/2002 | Rae et al. .......................... 360/25 |
| 2004/0252395 A1 * | 12/2004 | Elliott et al. ..................... 360/51 |
| 2007/0096950 A1 * | 5/2007 | Yang et al. ....................... 341/50 |
| 2010/0322359 A1 * | 12/2010 | Stockmanns et al. ......... 375/341 |

* cited by examiner

*Primary Examiner* — Paul Huber
(74) *Attorney, Agent, or Firm* — Advent, LLP (57) ABSTRACT

Techniques are disclosed for performing branch metric computations/noise predictive calibration/adaptation for over-sampled Y samples. In one or more embodiments, the techniques employ a data processing apparatus (circuit) that includes a parallel to serial convertor configured to receive a first stream of sample data (e.g., Y samples) and a second stream of sample data (e.g., Z samples). The parallel to serial convertor is operable to combine the first stream of sample data and the second stream of sample data into a combined stream of sample data (e.g., combined Y and Z samples). The data processing apparatus (circuit) further includes a filter (e.g., a noise predictive finite impulse response (NPFIR) filter, a noise whitening filter, such as a noise predictive calibration/adaptation module (NPCAL) filter, and so forth) that is configured to receive the combined stream of sample data and whiten noise in the combined stream of sample data.

20 Claims, 4 Drawing Sheets

BRANCH METRIC COMPUTATION AND NOISE PREDICTIVE CALIBRATION/ADAPTATION FOR OVER-SAMPLED Y SAMPLES

BACKGROUND

Various data processing systems have been developed including storage systems, cellular telephone systems, and radio transmission systems. In such systems, data is transferred from a sender to a receiver via a medium. For example, in a storage system, data is sent from a sender (e.g., a write function) to a receiver (e.g., a read function) via a storage medium. As information is stored and transmitted in the form of digital data, errors are introduced that, if not corrected, can corrupt the data and render the information unusable. The effectiveness of any transfer is impacted by any losses in data caused by various factors.

Consequently, error checking systems have been developed to detect and correct errors of digital data. Error checking systems are used, for example, to process data retrieved from a magnetic hard disk drive (HDD). Each data sector of the disk drive can have different noise, jitter, and distortion characteristics or signal to noise ratios (SNR), which can be due, for example, to magnetic media defects, off-track writing, high fly height of magnetic write heads during a writing operation, large phase disturbance, and so forth. The throughput of a HDD is affected by the number of read errors in a data sector, based in part on the SNR, and by the speed at which the read channel can recover from a read error by correcting the errors.

SUMMARY

Techniques for performing branch metric computations and noise predictive calibration/adaptation for over-sampled equalized sample data are disclosed. In one or more embodiments, the techniques are implemented in a data processing apparatus. The data processing apparatus includes a parallel to serial convertor configured to receive a first stream of sample data and a second stream of sample data. The parallel to serial convertor is operable to combine the first stream of sample data and the second stream of sample data into a combined stream of sample data. The data processing apparatus further includes a filter that is configured to receive the combined stream of sample data and whiten noise in the combined stream of sample data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identify the figure in which the reference number first appears. The use of the same reference number in different instances in the description and the figures may indicate similar or identical items.

DETAILED DESCRIPTION

Figure 1:
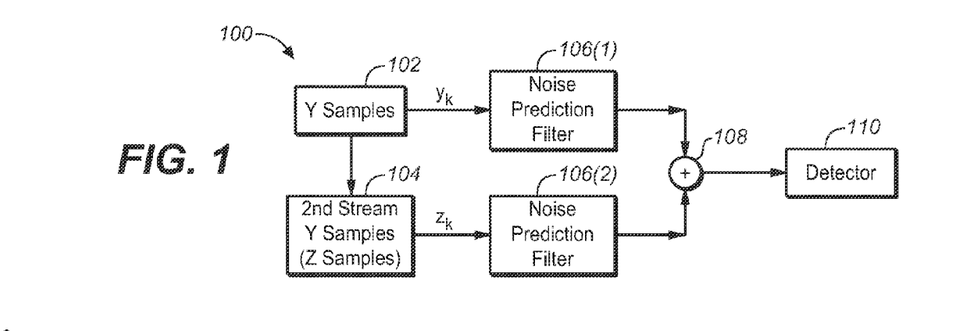
FIG. 1 is a block diagram that illustrates a detector system that is configured to filter oversampled streams of equalized digital sample data (e.g., over-sampled Y samples), wherein the streams of equalized digital sample data are filtered (whitened) separately and then averaged together.

Many error checking systems employ detection systems that use oversampled equalized digital sample data for branch metric computation. For example, as shown in FIG. 1, a twice (2×) oversampled equalized detection system 100 employs a first stream of equalized digital sample data (Y samples) or Y stream 102 and a second stream of equalized digital sample data (Z samples) or Z stream 104. In the embodiment shown, the Z stream is derived by interpolation based on the Y stream 102. Consequently, the Z stream 104 is dependent on the Y stream 102 by construction. However, in other embodiments, the Z stream 104 (Z samples) is derived in other ways. For example, in an embodiment, the Z stream 218 (Z samples) is derived by oversampling the analog to digital converter (ADC) of the system, to furnish a second stream of digital sample data (X samples) that is re-equalized. In another embodiment, the Z stream 104 is derived from a second analog signal from a storage or transmission channel (e.g., by re-reading a hard disk drive (HDD)), and so forth.

As shown, the Y stream 102 and the Z stream 104 are passed ($y_k$, $z_k$) to first and second noise predictive filters 106(1), 106(2), respectively. In an embodiment, the first and second noise predictive filters 106(1), 106(2) are noise predictive finite impulse response (NPFIR) filters. The noise predictive filters 106(1), 106(2) separately de-correlate (or whiten) the error terms of the respective Y and Z streams 102, 104, which are then combined (averaged) via adder 108 and squared to be used by the detector 110 as log-domain branch metrics from time k to time k+1, and so forth, in the trellis detector branch metric computation. Thus, coefficients for filtering the X and Y streams 102, 104 are separately computed using the equations:

$$\{g_i^*, f_i^*\eta^*\} = \arg\min_{g_i, f_i, \eta} E\left[y_k + \sum_{i=1}^{m} f_i y_{k-i} + \eta\right]^2 \quad \text{EQN. 1}$$

and $$\{u_i^*, v_i^*\mu^*\} = \arg\min_{u_i, v_i, \mu} E\left[z_k + \sum_{i=1}^{m} u_i z_{k-i} + \mu\right]^2 \quad \text{EQN. 2}$$

where $g_i^*$ and $f_i^*$ are coefficients for filtering Y stream 102, $u_i^*$ and $v_i^*$ are coefficients for filtering the Z stream 104, $\eta^*$ is the mean square error of noise in the Y stream 102, and $\mu^*$ is the mean square error of the noise in the Z stream 104. However, separately de-correlating (whitening) the first and second streams (Y samples and Z samples) 102, 104 does not allow optimum performance of detection system 100.

Techniques are disclosed to combine the 2× over-sampled equalized digital sample data into a combined stream of digital sample data so that the error terms in the combined stream of digital sample data is filtered (whitened) jointly to minimize the mean square error of noise in the sample data. In one or more embodiments, the techniques are implemented in a detection circuit of an error checking system or other data processing apparatus. The detection circuit includes a parallel to serial convertor configured to receive a first stream of sample data or Y stream (e.g., Y samples) and a second stream of sample data or Z stream (e.g., Z samples). The parallel to serial convertor is operable to combine the Y stream and Z stream into a combined stream of sample data (e.g., combined Y and Z samples). A filter configured to receive the combined stream of sample data (combined Y and Z samples) de-correlates (or whitens) noise in (e.g., the error terms of) the combined stream of sample data. In some embodiments, the filter comprises a noise predictive filter, such as a noise predictive finite impulse response (NPFIR) filter, operable to filter noise in the combined stream of sample data to yield one or more branch metrics. However, in other embodiments, the filter comprises a noise whitening filter, such as a noise predictive calibration/adaptation module (NPCAL) filter.

The techniques described herein are applicable to storage of information on virtually any media and/or transmission of information over virtually any channel. Storage applications include, but are not limited to: hard disk drives, compact disks, digital video disks, magnetic tapes and memory devices such as DRAM, NAND flash, NOR flash, other non-volatile memories and solid state drives. Transmission applications include, but are not limited to: optical fiber, radio frequency channels, wired or wireless local area networks, digital subscriber line technologies, wireless cellular, Ethernet over any medium such as copper or optical fiber, cable channels such as cable television, and Earth-satellite communications.

Figure 2A:
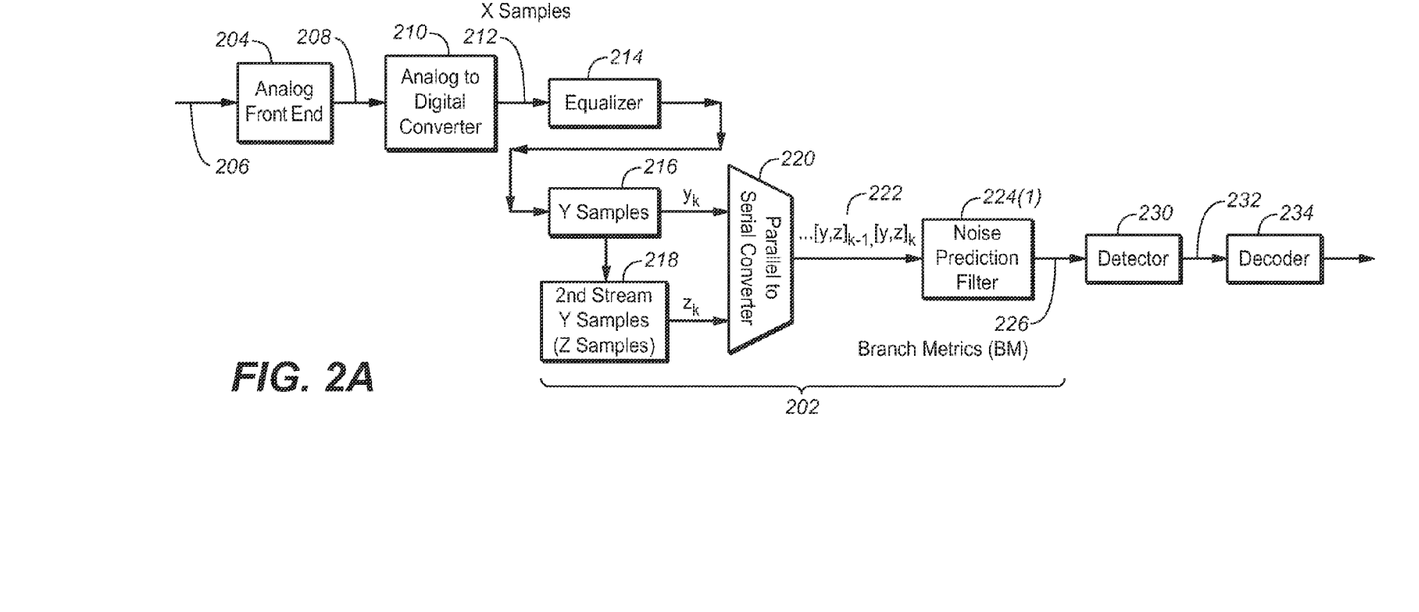
FIG. 2A is a block diagram that illustrates a data processing apparatus that includes a detector system which is configured to provide branch metric computation of over-sampled streams of digital sample data (e.g., over-sampled Y samples) in accordance with an embodiment of the disclosure.
Figure 2B:
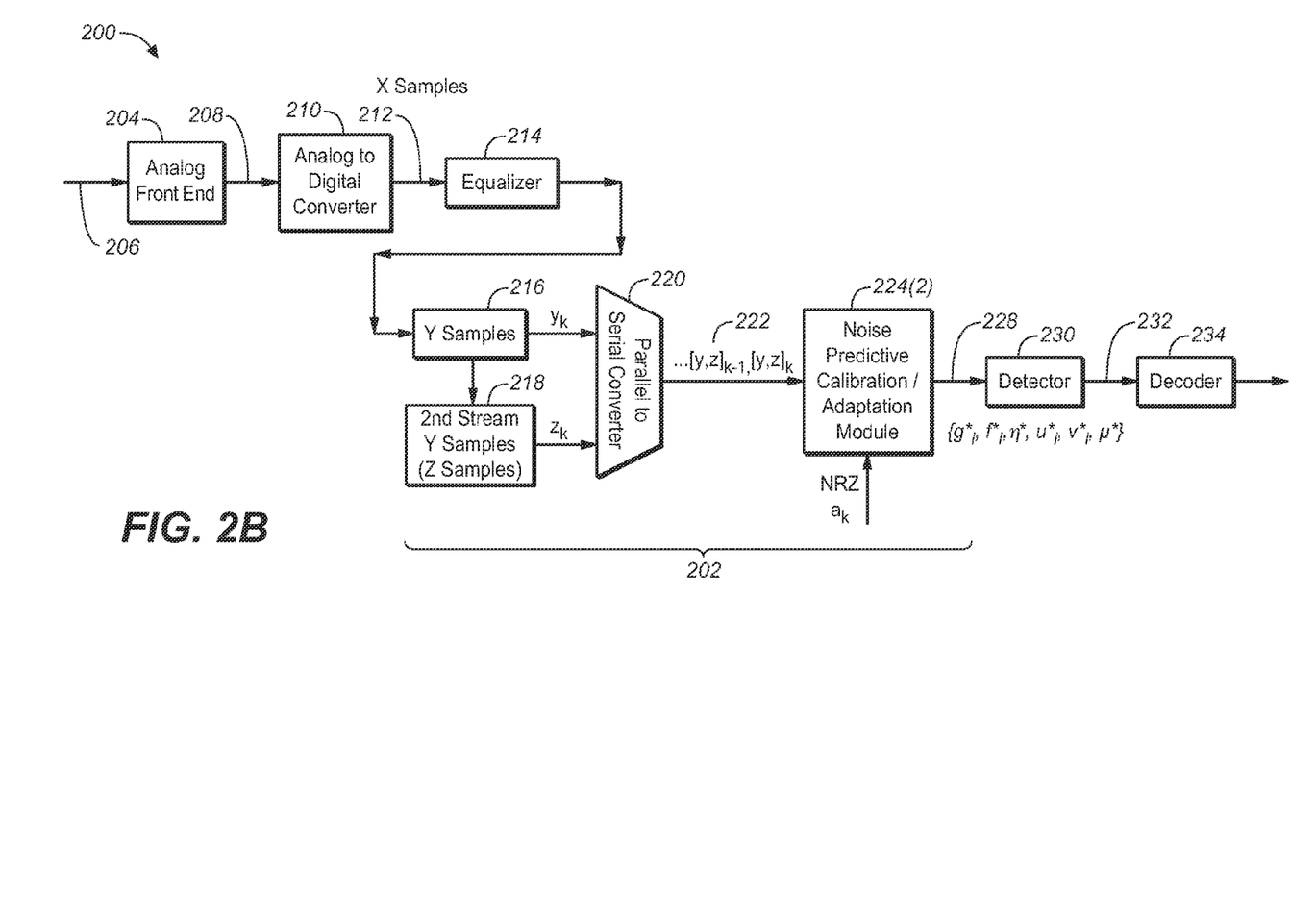
FIG. 2B is a block diagram that illustrates a data processing apparatus that includes a detector circuit which is configured to provide noise predictive calibration/adaptation of over-sampled streams of digital sample data (e.g., over-sampled Y samples) in accordance with an embodiment of the disclosure.

FIGS. 2A and 2B illustrate data processing apparatus 200 that employs twice (2×) oversampled equalized detection system 202 in accordance with example embodiments of the present disclosure. The data processing apparatus 200 includes an analog front end 204 that receives and processes an analog signal 206 from a storage or transmission channel.

In an embodiment, the analog front end 204 includes, but is not necessarily limited to: an analog filter, or an amplifier circuit. For example, in embodiments, the analog front end 204 includes a high pass filter, a variable gain amplifier (VGA), a compensation circuit for the magneto-resistive asymmetry (MRA) characteristic of a magnetic write head, and so forth. In some embodiments, the gain of a variable gain amplifier included as part of analog front circuit 204 and the cutoff frequency and boost of an analog filter included in analog front end circuit 204 is modifiable.

The analog front end 204 receives and processes the analog signal 206, and provides a processed analog signal 208 to an analog to digital converter (ADC) 210. In embodiments, the analog signal 206 is derived from a variety of sources. For example, in some embodiments, the analog signal 206 is derived from a read/write head assembly in a storage or transmission channel that is disposed in relation to a storage medium. In other embodiments, analog signal 206 is derived from a receiver circuit in a storage or transmission channel that is operable to receive a signal from a transmission medium. In embodiments, the transmission medium is wireless or wired and includes, but is not necessarily limited to, cable or optical connectivity. Other examples are possible.

The analog to digital converter (ADC) 210 converts the processed analog signal 208 into a corresponding series or stream of digital sample data 212 or X samples. The analog to digital converter (ADC) 210 comprises a circuit that is capable of producing digital sample data corresponding to an analog input signal 208. It will be appreciated that a variety of analog to digital converters (ADCs) 210 are employed by different embodiments of the data processing apparatus 200. It is further contemplated that, in embodiments, the stream of digital sample data (X samples) 212 is obtained directly from a digital storage device or digital transmission medium, without the use of an analog to digital converter (ADC) 210.

The stream of digital sample data (X samples) 212 is provided to one or more equalizers (a single equalizer 214 is shown). The equalizer 214 applies an equalization algorithm to the stream of digital sample data (X samples) 212 to yield a stream of equalized sample data or Y stream 216 (Y samples). In embodiments, the equalizer 214 comprises a digital finite impulse response (DFIR) filter circuit. However, other embodiments are contemplated. In embodiments, the equalized digital sample data (Y samples) of the Y stream 216 are stored in a Y memory (not shown) until the detection system 202 is available to begin processing the data 216 as discussed below.

A second stream of equalized digital sample data or Z stream 218 (Z samples) is also provided. In the illustrated embodiment, the Z stream 218 (Z samples) is derived by interpolation based on the Y stream 216. Thus, in this embodiment, the Z stream 218 is dependent on the Y stream 216 by construction. However, in other embodiments, the Z stream 218 (Z samples) is derived in other ways. For example, in an embodiment, the Z stream 218 (Z samples) are derived by oversampling the ADC 210 to generate a second stream of digital sample data (X samples) that is re-equalized (e.g., by equalizer 214). In another embodiment, the Z stream 218 (Z samples) are derived from a second analog signal 206 from a storage or transmission channel (e.g., by re-reading a hard disk drive (HDD)), and so forth.

As shown, the Y stream 216 and the Z stream 218 are passed ($y_k$, $z_k$) to a parallel to serial (P2S) convertor 220, which combines the Y stream 216 and the Z stream 218 into a combined stream of equalized sample data or combined Y and Z stream 222 (combined Y and Z samples). In embodiments, the parallel to serial (P2S) converter 220 comprises a circuit or device that is capable of combining two separate streams of digital data into a single third stream of digital data. For example, in an embodiment, the parallel to serial (P2S) converter 20 comprises buffer memory. In such an embodiment, the Y stream 216 is written to first addresses (e.g., even addresses) of the buffer memory, while the Z stream 218 is written to second addresses of the buffer memory (e.g., odd addresses). The combined Y and Z stream 222 is then read from the buffer memory with a faster clock speed, sequentially. However, it will be appreciated that, in embodiments, a variety of other parallel to serial (P2S) converters 220 are employed by different embodiments of the data processing apparatus 200.

The combined Y and Z stream (combined Y and Z samples) 222 is provided ( . . . [y, z]$_{k-1}$, [y, z]$_k$) to a filter 224 that de-correlates (or whitens) noise in (e.g., the error terms of) the combined Y and Z stream 222.

For example, in the embodiment shown in FIG. 2A, the combined Y and Z stream (combined Y and Z samples) 222 is provided ( . . . [y, z]k−1, [y, z]k) to a noise predictive filter 224(1), such as a noise predictive finite impulse response (NPFIR) filter, or the like. The noise predictive filter 224(1) is operable to filter noise in the combined Y and Z stream 222 to yield uncorrelated filter output for the branch metrics (BM) 226 which are furnished to the detector 218. In this embodiment, the path metric (PM) of the detector trellis is formulated as the logarithm of the posterior probability in the following equation:

$$PM = \log(p(y_N, z_N, y_{N-1}, z_{N-1}, y_{N-2}, z_{N-2}, \ldots \quad \text{EQN. 3}$$
$$y_0, z_0 \mid a_N, a_{N-1}, \ldots, a_0))$$
$$= \log\left(\prod_{k=0}^{N} p(y_k, z_k \mid y_{k-1}, z_{k-1}, y_{k-2}, z_{k-2}, \ldots \right.$$
$$\left. y_0, z_0, a_k, a_{k-1}, \ldots, a_0)\right)$$

The detection algorithm (SOVA/Viterbi) finds the most likely sequence ($a_0, a_1, \ldots a_N$) that maximizes the path metric (PM). This decision is termed the maximum likelihood (ML) decision sequence. From EQN. 3, it is determined that:

$$p(y_k, z_k \mid y_{k-1}, z_{k-1}, y_{k-2}, z_{k-2}, \ldots y_0, z_0, a_k, a_{k-1}, \ldots, a_0) = \quad \text{EQN. 4}$$
$$p(y_k \mid z_k, y_{k-1}, z_{k-1}, \ldots, a_k, a_{k-1}, \ldots)$$
$$p(z_k \mid y_{k-1}, z_{k-1}, \ldots, a_k, a_{k-1}, \ldots)$$

From EQN. 4, the logarithm branch metric formulation, which is based on Gaussian noise assumptions, is determined by:

$$BM = \log\left(\frac{1}{\sqrt{2\pi\sigma_1^2}} e^{\frac{(y_k + \sum_{i=0}^{m} g_i z_{k-i} \sum_{i=0}^{m} f_i y_{k-i} \eta)^2}{2\sigma_1^2}}\right. \quad \text{EQN. 5}$$
$$\left. \frac{1}{\sqrt{2\pi\sigma_2^2}} e^{\frac{(z_k + \sum_{i=1}^{m} u_i z_{k-i} \sum_{i=1}^{m} v_i y_{k-i} \mu)^2}{2\sigma_2^2}}\right)$$

Thus, instead of filtering Y and Z samples independently and then averaging the samples, the Y and Z samples are treated as one single data stream, wherein the noise is whitened jointly to minimize the mean square error signals. Each branch metric (BM) term thus has two separate Euclidean terms instead of one, as is illustrated by the following equation:

$$BM = \quad \text{EQN. 6}$$
$$const + \log(\sigma_1) + \log(\sigma_2) + \frac{\left(y_k + \sum_{i=0}^{m} g_i z_{k-i} + \sum_{i=1}^{m} f_i y_{k-i} + \eta\right)^2}{2\sigma_1^2} +$$
$$\frac{\left(z_k + \sum_{i=1}^{m} u_i z_{k-i} + \sum_{i=1}^{m} v_i y_{k-i} + \mu\right)^2}{2\sigma_2^2}$$

In the embodiment shown in FIG. 2B, the combined Y and Z stream (combined Y and Z samples) 222 is provided ( . . . [y, z]k−1, [y, z]k) to a noise whitening filter 224(2), such as a noise predictive calibration/adaptation module (NPCAL) filter, which configures the coefficients 228 that are used for branch metric computation, as shown in the following equations:

$$\{g_i^*, f_i^*\eta^*\} = \arg_{g_i, f_i, \eta} \min E\left[y_k + \sum_{i=0}^{m} g_i z_{k-i} + \sum_{i=1}^{m} f_i y_{k-i} + \eta\right]^2 \quad \text{EQN. 7}$$

$$\{u_i^*, v_i^*\mu^*\} = \arg_{u_i, v_i, \mu} \min E\left[z_k + \sum_{i=1}^{m} u_i z_{k-i} + \sum_{i=1}^{m} v_i y_{k-i} + \mu\right]^2 \quad \text{EQN. 8}$$

Again, instead of filtering Y and Z samples independently and then averaging them, the Y and Z samples are treated as one single data stream, wherein the noise is whitened jointly to minimize the mean square error signals. In this embodiment, the detector branch metric computation fixed point is determined for a certain error variance range. The scaling of the noise whitening filter 224(2) is controlled so that the output of the filter 224(2) has the best fixed point quantization that corresponds to the detector branch metric computation precisions. The respective branches have an Euclidean metric term $\sim$(error)$^2$+log term. Thus, with scaling, the branch metric dynamic ranges are within a numerical range for which the detector fixed point is determined. The scaling factor, shown in EQN. 9, is tuned to achieve this numerical range.

$$E\left[\xi\left(\frac{\left(y_k + \sum_{i=0}^{m} g_i z_{k-i} + \sum_{i=1}^{m} f_i y_{k-i} + \eta\right)^2}{2\sigma_1^2} + \right.\right. \quad \text{EQN. 9}$$
$$\left.\left. \frac{\left(z_k + \sum_{i=1}^{m} u_i z_{k-i} + \sum_{i=1}^{m} v_i y_{k-i} + \mu\right)^2}{2\sigma_2^2}\right)\right]$$

In embodiments, the detector 230 comprises a Viterbi algorithm data detector circuit, such as a Soft-Output Viterbi (SOVA) algorithm data detector circuit. However, it is contemplated that, in embodiments, the Viterbi algorithm data detector circuit comprises other Viterbi detection algorithms or Viterbi algorithm detector circuits, or variations thereof including, but not limited to: bi-direction Viterbi detection algorithms or bi-direction Viterbi algorithm detector circuits. In other embodiments, the detector 230 comprises a maximum a posteriori (MAP) data detector circuit. Again, it is contemplated that, in embodiments, the maximum a posteriori (MAP) data detector circuit comprises other maximum a posteriori (MAP) detection algorithms or detector circuits or variations thereof including, but not limited to: simplified maximum a posteriori (MAP) data detection algorithms, max-log maximum a posteriori (MAP) data detection algorithms, or corresponding detector circuits.

Upon completion, the detector 230 provides detected output 232. The detected output 232 includes soft data. Herein, the term "soft data" is used in its broadest sense to mean reliability data with each occurrence of the reliability data indicating likelihood that a corresponding bit position or group of bit positions has been correctly detected. In some embodiments, the soft data or reliability data comprises log likelihood ratio data. The detected output 232 is provided to a decoder 234 for decoding. The decoder 234 applies a data decode algorithm to the detected output 232. In embodiments, the decoder 234 comprises any type of decoder circuit including binary and no-binary, layered and non-layered. In embodiments, the decoder is a low density parity check (LDPC) decoder circuit. In some embodiments, the detected output 232 is interleaved in a local interleaver circuit (not shown) to shuffle sub-portions (i.e., local chunks) of the data set included as detector output 232, and stored in a central memory (not shown).

Figure 3:
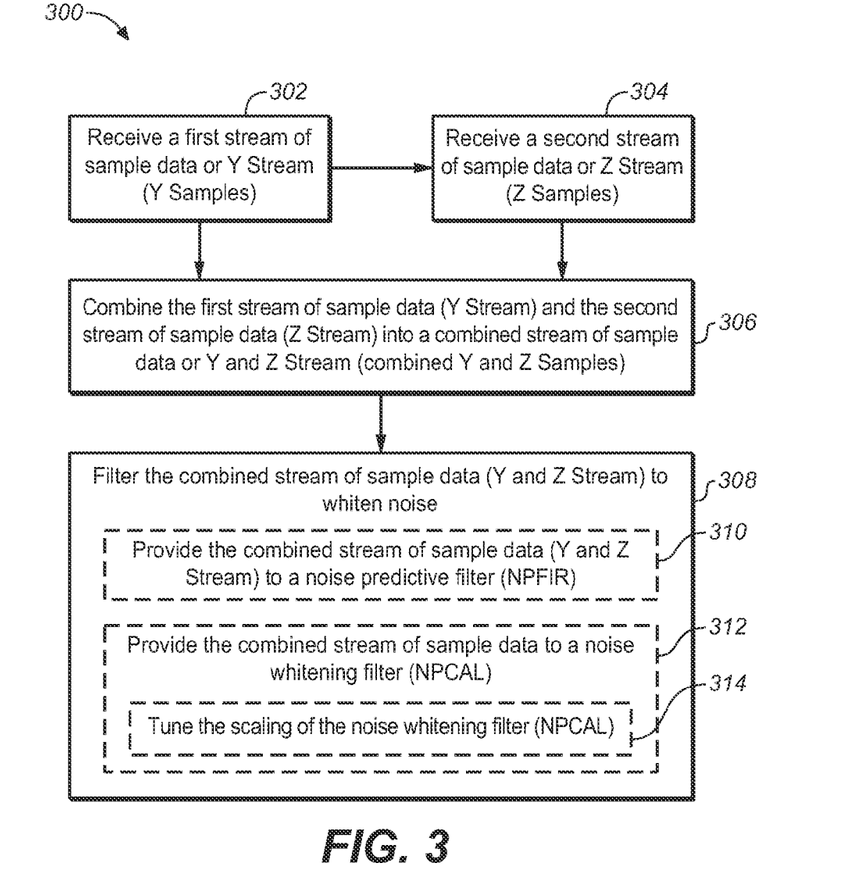
FIG. 3 is a flow diagram that illustrates a method in an embodiment of the disclosure that is employed by the data processing apparatus of FIGS. 2A and 2B to perform branch metric computations or noise predictive calibration/adaptation of over-sampled streams of digital sample data (e.g., over-sampled Y samples).

FIG. 3 illustrates a method 300 in an embodiment of the disclosure that is employed by a twice (2×) oversampled equalized detection system, such as the detection system 202 of FIGS. 1A and 1B, to combine 2× over-sampled equalized digital sample data into a combined stream of digital sample data so that the error terms in the combined stream of digital sample data is filtered (whitened) jointly to minimize the mean square error of noise in the sample data. As shown, a first stream of sample data or Y stream (Y Samples) is received (Block 202). Similarly, a second stream of sample data or Z stream (Z Samples) is received (Block 204). The Z stream is derived from the Y stream. For example, as shown in FIGS. 2A and 2B, the equalizer 214 yields a stream of equalized sample data or Y stream 216 (Y samples). The second stream of equalized digital sample data or Z stream 218 (Z samples) is derived by interpolation based on the Y stream 216. Thus, in embodiments, the Z stream 218 is dependent on the Y stream 216 by construction.

The first stream of sample data (Y Stream) and the second stream of sample data (Z Stream) are combined into a combined stream of sample data or Y and Z Stream (combined Y and Z Samples) (Block 306). As shown in FIGS. 2A and 2B, the Y stream 216 and the Z stream 218 is passed ($y_k$, $z_k$) to a parallel to serial (P2S) convertor 220, which combines the Y stream 216 and the Z stream 218 into a combined stream of equalized sample data or combined Y and Z stream 222 (combined Y and Z samples).

The combined stream of sample data (Y and Z Stream) is then filtered to whiten noise 308. For example, as shown in FIGS. 2A and 2B, the combined Y and Z stream (combined Y and Z samples) 222 is provided ( . . . [y, z]$_{k-1}$, [y, z]$_k$) to a filter 224 that de-correlates (or whitens) noise in (e.g., the error terms of) the combined Y and Z stream 222. Thus, instead of filtering Y and Z samples independently and then averaging the samples, the Y and Z samples are treated as one single data stream, wherein the noise is whitened jointly to minimize the mean square error signals.

In embodiments, the combined stream of sample data (Y and Z Stream) is provided to a noise predictive filter (NPFIR) (Block 310). For example, in the embodiment shown in FIG. 2A, the combined Y and Z stream (combined Y and Z samples) 222 is provided ( . . . [y, z]k−1, [y, z]k) to a noise predictive filter 224(1), such as a noise predictive finite impulse response (NPFIR) filter, or the like. The noise predictive filter 224(1) is operable to filter noise in the combined Y and Z stream 222 to yield uncorrelated filter output for the branch metrics (BM) 226 which are furnished to the detector 218 as discussed above.

In other embodiments, the combined stream of sample data is provided to a noise whitening filter (NPCAL) (Block 312). For example, in the embodiment shown in FIG. 2B, the combined Y and Z stream (combined Y and Z samples) 222 is provided ( . . . [y, z]k−1, [y, z]k) to a noise whitening filter 224(2), such as a noise predictive calibration/adaptation module (NPCAL) filter, which configures the coefficients 228 that are used for branch metric computation as discussed above. In this embodiment, the scaling of the noise whitening filter (NPCAL) is tuned (Block 314). The detector branch metric computation fixed point is determined for a certain error variance range. The scaling of the noise whitening filter 224(2) is controlled so that the output of the filter 224(2) has the best fixed point quantization that corresponds to the detector branch metric computation precisions. Each branch has an Euclidean metric term $\sim(error)^2+\log$ term. Thus, with scaling, the branch metric dynamic ranges is within a numerical range for which the detector fixed point is determined. The scaling factor, shown in EQN. 9 above, is tuned to achieve this numerical range.

Figure 4:
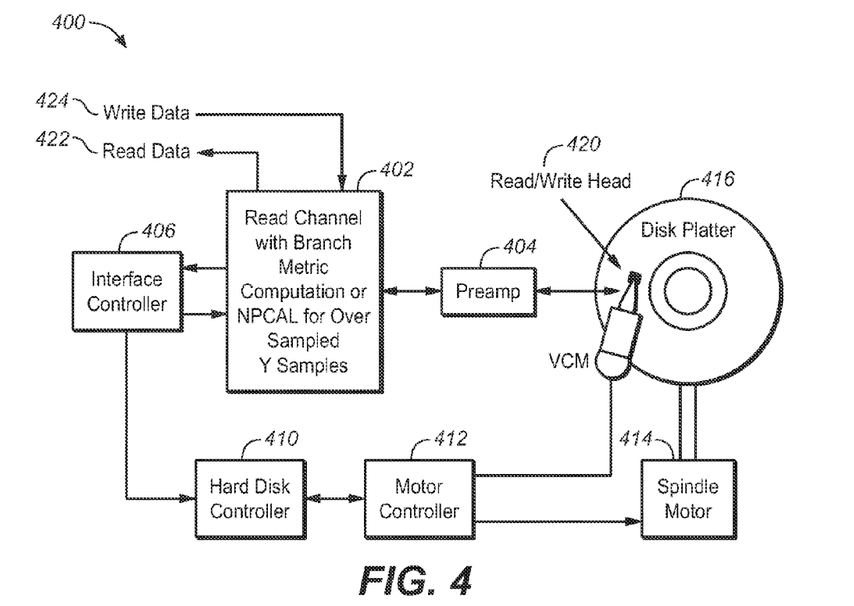
FIG. 4 is a block diagram that illustrates a storage system having a read channel that employs a data processing circuit, such as the data processing apparatus of FIGS. 2A and 2B, to perform branch metric computations or noise predictive calibration/adaptation of over-sampled streams of digital sample data (e.g., over-sampled Y samples) by combining the over-sampled streams into a combined stream of digital sample data in accordance with an embodiment of the disclosure.
Figure 5:
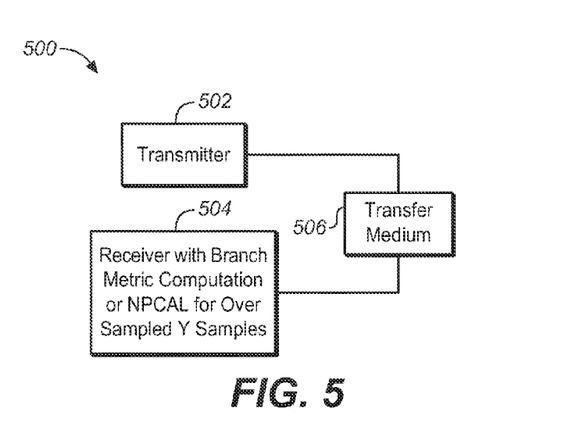
FIG. 5 is a block diagram that illustrates a wireless communication system having a receiver that employs a data processing circuit, such as the data processing apparatus of FIGS. 2A and 2B, to perform branch metric computations or noise predictive calibration/adaptation of over-sampled streams of digital sample data (e.g., over-sampled Y samples) by combining the oversampled streams into a combined stream of digital sample data in accordance with an embodiment of the disclosure.

Although the data-dependent equalizer circuit disclosed herein is not limited to any particular application, several examples of applications are presented in FIGS. 4 and 5. In FIG. 4, a storage system 400 is illustrated. The storage system 400 includes a read channel circuit 402 that employs branch metric computation or noise predictive calibration/adaptation for over sampled Y samples in accordance with an embodiment of the disclosure, such as the twice (2×) oversampled equalized detection system 202 shown in FIGS. 2A and 2B. In embodiments, the storage system 400 is, for example, a hard disk drive (HDD). As shown, the storage system 400 includes a preamplifier 404, an interface controller 406, a hard disk controller 410, a motor controller 412, a spindle motor 414, a disk platter 416, and a read/write head assembly 420. The interface controller 406 controls addressing and timing of data to/from the disk platter 416. The data on the disk platter 416 includes groups of magnetic signals that are detected by the read/write head assembly 420 when the assembly is properly positioned over disk platter 416. In one or more embodiments, the disk platter 416 includes magnetic signals recorded in accordance with either a longitudinal or a perpendicular recording scheme.

In a typical read operation, the read/write head assembly 420 is accurately positioned by the motor controller 412 over a desired data track on the disk platter 416. The motor controller 412 positions the read/write head assembly 420 in relation to the disk platter 416 and drives the spindle motor 414 by moving the read/write head assembly 420 to the proper data track on the disk platter 416 under the direction of the hard disk controller 410. The spindle motor 414 spins the disk platter 416 at a determined spin rate (e.g., at a determined number of revolutions per minute (RPM)). Once the read/write head assembly 420 is positioned adjacent the proper data track, magnetic signals representing data on the disk platter 416 are sensed by the read/write head assembly 420 as the disk platter 416 is rotated by the spindle motor 414. The sensed magnetic signals are provided as a continuous, minute analog signal representative of the magnetic data on the disk platter 416. This minute analog signal is transferred from the read/write head assembly 420 to the read channel circuit 402 via a preamplifier 404. The preamplifier 404 is operable to amplify the minute analog signals accessed from the disk platter 416. In turn, the read channel 402 decodes and digitizes the received analog signal to recreate the information originally written to the disk platter 416. This data is provided as read data 422 to a receiving circuit. As part of decoding the received information, the read channel 402 processes the received signal using the data-dependent equalizer circuit 102 as described herein. A write operation is substantially the opposite of the preceding read operation with write data 424 being provided to the read channel 402. This data is then encoded and written to the disk platter 416.

It should be noted that, in embodiments, the storage system 400 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments, data is mirrored to multiple disks in the RAID storage system, or is sliced and distributed across multiple disks using a number of techniques. If a small number of disks in the RAID storage system fail or become unavailable, error correction techniques are used to recreate the missing data based on the remaining portions of the data from the other disks in the RAID storage system. In embodiments, the disks in the RAID storage system include, but are not limited to: individual storage systems such as storage system 400, and are located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

FIG. 5 illustrates a wireless communication system 500 or data transmission device including a receiver 504 that employs branch metric computation or noise predictive calibration/adaptation for over sampled Y samples in accordance with an embodiment of the disclosure, such is implemented by the twice (2×) oversampled equalized detection system 202 shown in FIGS. 2A and 2B. The communication system 500 includes a transmitter 502 that is operable to transmit encoded information via a transfer medium 506. The encoded data is received from the transfer medium 506 by a receiver 504. As part of the processing of the encoded data, the receiver 504 processes the received signal using a twice (2×) oversampled equalized detection system 202 employing the techniques described herein. In embodiments, the receiver 504 is fabricated in various ways including, but not limited to, being fabricated as a stand-alone receiver or as part of a transceiver.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the case of a hardware embodiment, for example, the various blocks discussed in the above disclosure can be implemented as integrated circuits along with other functionality. In embodiments, such integrated circuits include all of the functions of a given block, system or circuit, or a portion of the functions of the block, system or circuit. Further, in embodiments, elements of the blocks, systems or circuits are implemented across multiple integrated circuits. Such integrated circuits include any type of integrated circuit including, but not necessarily limited to: a monolithic integrated circuit, a flip chip integrated circuit, a multichip module integrated circuit, and/or a mixed signal integrated circuit. In the case of a software embodiment, for example, the various blocks discussed in the above disclosure represent executable instructions (e.g., program code) that perform specified tasks when executed on a processor. In embodiments, these executable instructions are stored in one or more tangible computer readable media. In some such embodiments, the entire system, block or circuit is implemented using its software or firmware equivalent. In other embodiments, one part of a given system, block or circuit is implemented in software or firmware, while other parts are implemented in hardware.

Although the subject matter has been described in language specific to structural features and/or methodological acts, it is to be understood that the subject matter defined in the appended claims is not necessarily limited to the disclosed embodiments. Although various configurations are discussed, the apparatus, systems, subsystems, components and so forth can be constructed in a variety of ways without departing from this disclosure. Rather, the specific features and acts are disclosed as embodiments of implementing the claims.

What is claimed is:

1. A data processing apparatus, comprising:
   a parallel to serial convertor configured to receive a first stream of sample data and a second stream of sample data, the parallel to serial convertor operable to combine the first stream of sample data and the second stream of sample data into a combined stream of sample data; and
   a filter configured to receive the combined stream of sample data, the filter operable to whiten noise in the combined stream of sample data.

2. The data processing apparatus as recited in claim 1, wherein the filter comprises a noise predictive filter operable to filter noise in the combined stream of sample data to yield one or more branch metrics.

3. The data processing apparatus as recited in claim 2, wherein the noise prediction filter comprises a noise predictive finite impulse response (NPFIR) filter.

4. The data processing apparatus as recited in claim 1, wherein the filter comprises a noise whitening filter.

5. The data processing apparatus as recited in claim 4, wherein the noise whitening filter comprises a noise predictive calibration/adaptation module (NPCAL) filter.

6. The data processing apparatus as recited in claim 4, wherein scaling of the noise whitening filter is tuned so that the whitened combined stream of sample data has a fixed point quantization that at least substantially corresponds to a detector branch metric.

7. The data processing apparatus as recited in claim 1, wherein the first stream of sample data comprises Y samples and the second stream of sample data comprises Z samples, the Z samples interpolated from the Y samples.

8. A method comprising:
   receiving a first stream of sample data;
   receiving a second stream of sample data;
   combining the first stream of sample data and the second stream of sample data into a combined stream of sample data; and
   filtering the combined stream of sample data to whiten noise in the combined stream of sample data.

9. The method as recited in claim 8, wherein filtering of the combined stream of sample data comprises providing the combined stream of sample data to a noise predictive filter operable to filter noise in the combined stream of sample data to yield one or more branch metrics.

10. The method as recited in claim 9, wherein the noise prediction filter comprises a noise predictive finite impulse response (NPFIR) filter.

11. The method as recited in claim 8, wherein filtering of the combined stream of sample data comprises providing the combined stream of sample data to a noise whitening filter.

12. The method as recited in claim 11, wherein the noise whitening filter comprises a noise predictive calibration/adaptation module (NPCAL) filter.

13. The method as recited in claim 10, further comprising tuning scaling of the noise whitening filter so that the whitened combined stream of sample data has a fixed point quantization that at least substantially corresponds to a detector branch metric.

14. The method as recited in claim 8, wherein the first stream of sample data comprises Y samples and the second stream of sample data comprises Z samples, the Z samples interpolated from the Y samples.

15. A storage system, comprising:
 a storage medium configured to maintain a data set;
 a read/write assembly operable to read the data set on the storage medium; and
 a data processing apparatus operable to correct errors in the data set read from the storage medium, comprising:
  a parallel to serial convertor configured to receive a first stream of sample data and a second stream of sample data, the parallel to serial convertor operable to combine the first stream of sample data and the second stream of sample data into a combined stream of sample data; and
  a filter configured to receive the combined stream of sample data, the filter operable to whiten noise in the combined stream of sample data.

16. The storage system as recited in claim 15, wherein the filter comprises a noise predictive filter operable to filter noise in the combined stream of sample data to yield one or more branch metrics.

17. The storage system as recited in claim 16, wherein the noise prediction filter comprises a noise predictive finite impulse response (NPFIR) filter.

18. The storage system as recited in claim 15, wherein the filter comprises a noise whitening filter.

19. The storage system as recited in claim 18, wherein the noise whitening filter comprises a noise predictive calibration/adaptation (NPCAL) filter.

20. The storage system as recited in claim 15, wherein the first stream of sample data comprises Y samples and the second stream of sample data comprises Z samples, the Z samples interpolated from the Y samples.

* * * * *